(12) United States Patent
Lee et al.

(10) Patent No.: US 8,046,682 B2
(45) Date of Patent: Oct. 25, 2011

(54) METHOD AND SYSTEM FOR ACCESSING BUSINESS APPLICATIONS VIA A STANDARD INTERFACE

(75) Inventors: King-Hwa Lee, Newcastle, WA (US); Nicholas J. Brown, Lynnwood, WA (US)

(73) Assignee: Siebel Systems, Inc., San Mateo, CA (US)

( * ) Notice: Subject to any disclaimer, the term of this patent is extended or adjusted under 35 U.S.C. 154(b) by 1225 days.

(21) Appl. No.: 10/714,730

(22) Filed: Nov. 17, 2003

(65) Prior Publication Data

US 2007/0208576 A1  Sep. 6, 2007

Related U.S. Application Data

(60) Provisional application No. 60/453,726, filed on Dec. 2, 2002.

(51) Int. Cl.
*G06F 17/00* (2006.01)
*G06F 15/16* (2006.01)

(52) U.S. Cl. ......... 715/236; 715/234; 715/747; 709/219

(58) Field of Classification Search ................... 715/700, 715/740, 234, 236, 239, 744–747, 760; 719/311; 709/203, 217–219
See application file for complete search history.

(56) References Cited

U.S. PATENT DOCUMENTS

| | | | | |
|---|---|---|---|---|
| 5,761,673 A * | 6/1998 | Bookman et al. | ............ | 719/311 |
| 5,831,609 A * | 11/1998 | London et al. | ................ | 715/746 |
| 6,342,905 B1 * | 1/2002 | Diedrich et al. | ............... | 715/746 |
| 6,631,512 B1 * | 10/2003 | Onyeabor | ..................... | 717/100 |
| 6,915,486 B2 * | 7/2005 | Li et al. | ......................... | 715/765 |
| 6,941,520 B1 * | 9/2005 | Lewallen | ..................... | 715/762 |
| 2002/0029296 A1 * | 3/2002 | Anuff et al. | ................... | 709/311 |
| 2003/0105884 A1 * | 6/2003 | Upton | ........................... | 709/318 |
| 2003/0172344 A1 * | 9/2003 | Dencker et al. | .............. | 715/500 |

OTHER PUBLICATIONS

Hallberg et al., "Using Microsoft Excel 97", published by Que Corporation, copyright 1997 Que Corporation, pp. 383, 394, 638.*

* cited by examiner

*Primary Examiner* — William L Bashore
*Assistant Examiner* — Andrew Tank
(74) *Attorney, Agent, or Firm* — Campbell Stephenson LLP (57) ABSTRACT

A method and system for integrating business application elements of an external business application into an internal business application where the integration system maps the output of external business applications to a Extensible Markup Language ("XML") format. The XML format defines a standard format for the business application elements generated by the external business applications and provided to the internal business applications by the integration system. When developing a new internal business application, developers can work with the XML formatted elements provided by the integration system without having to learn the different formats provided by the various external business applications. The integration system is responsible for converting the data generated by the external business application to the XML format.

29 Claims, 5 Drawing Sheets

METHOD AND SYSTEM FOR ACCESSING BUSINESS APPLICATIONS VIA A STANDARD INTERFACE

CROSS-REFERENCE TO RELATED APPLICATION(S)

This application claims the benefit of U.S. Provisional Patent Application No. 60/453,726, filed Dec. 2, 2002, which is hereby incorporated by reference in its entirety.

TECHNICAL FIELD

The described technology relates generally to providing a standard interface, such as an XML interface, to business applications.

BACKGROUND

Many business applications have been developed to operate in client/server environments. Client computer systems typically interact with business applications via a web-based interface. Such client computer systems use browsers to access a web server that interfaces with the business applications. The browsers display pages of information received from web servers. When a user selects a displayed link, the browser sends a request associated with that link to the web server identified by the link. The requests may be HTTP-request messages, WAP-request messages, and so on. The requests may include a uniform resource locator to identify a resource to be accessed and parameters that specify the type of access to the resource. When the web server receives such a request, it parses the request and invokes the appropriate business application to process the request. The invoked business application may generate a responsive document, such as an HTML document, a WML document, and so on. The business application sends the document to the web server, which encapsulates the document into a response message, such as an HTTP-response message, a WAP-response message, and so on. The web server then sends the response message to the requesting client computer system. The browser of the client computer system then processes the document, which may result in an update of the displayed information.

Many companies may develop some of their own business applications ("internal business applications"), but oftentimes they purchase the bulk of their business applications ("external business applications") from other companies. When a company develops an internal business application, it may want to use the functionality and data provided by external business applications. For example, the marketing organization of a company may develop a business application to perform some analysis on its customer base. Valuable information about its customer base may be available through an external business application such as a customer relationship management ("CRM") business application. The internal business application may invoke the CRM application to retrieve data. It may then analyze the retrieved data and display the results of the analysis to a user. In many cases, the company may want the internal business application to display some data provided by the CRM business application along with the results of the analysis. It is currently a difficult and complex process to integrate the results of the analysis of an internal business application and the data provided by an external business application into a consistent and user-friendly interface. It would be desirable to have a method and system that would allow companies the flexibility to efficiently integrate the data and user interface of external business applications with their internal business applications in a way that is consistent and user-friendly.

DETAILED DESCRIPTION

A method and system for integrating business application elements of an external business application into an internal business application is provided. The internal business application may include portal, web, or other applications that can process business application elements provided in a standard format provided by the integration system. In one embodiment, the integration system maps the output of external business applications to an Extensible Markup Language ("XML") format. The XML format defines a standard format for the business application elements generated by the external business applications and provided to the internal business applications by the integration system. When developing a new internal business application, developers can work with the XML formatted elements provided by the integration system without having to learn the different formats provided by the various external business applications. The integration system is responsible for converting the data generated by the external business application to the XML format.

The integration system provides various techniques to help facilitate the integration of internal and external business applications. The integration system allows an internal business application to specify in a request whether it wants only the data elements or both the data elements and some user interface elements that are generated by the external business application. In another embodiment, the integration system allows an internal business application to request a predefined transform for transforming the elements from the standard format into a format that is compatible with the internal business application. In another embodiment, the integration system allows an internal business application to specify the format of the output provided by the integration system. The integration system may have a default format that can be overridden based on the browser type of the requesting browser or overridden based on a format specified by the internal business application in the request.

In one embodiment, the integration system in response to a request optionally returns data elements only or data elements plus various user interface elements. The integration system receives from an internal business application (e.g., via a browser that is displaying pages generated by the internal business application) requests to execute commands of external business applications. The requests may indicate what user interface elements are to be returned along with the data elements resulting from execution of the command by the external business application. When the request indicates to return some user interface elements, the user interface elements are generated and returned along with the data elements to the client system executing the internal business application. When a request indicates to not return any user interface elements, the data elements are returned without any user interface elements. In one embodiment, an external business application returns data elements along with user interface elements, and the integration system removes user interface elements as appropriate. In another embodiment, the external business application may be provided with an indication of what user interface elements, if any, to include in the returned results. The user interface elements may be selectively excluded from the returned results. For example, the internal business application may request that all navigation elements be excluded or that selective navigation elements be excluded.

The integration system may allow an internal business application to request an external business application to provide a list of predefined queries (e.g., an SQL query) for the internal business application. In response to receiving such a request, the external business application provides a list of predefined queries to the internal business application which can then be used by the internal business application to select a query that is to be executed by the external business application.

In one embodiment, the integration system allows transforms to be defined for transforming the output of external business applications that are in the standard format into a different format as requested by an internal business application. When a request is received from an internal business application to execute a command of an external business application, the request may optionally indicate the name of the transform that is to be applied to the output of the internal business application. When the external business application executes the command and provides its output, the integration system then converts the output to the standard XML format as appropriate and applies the transform to the generated output to generate transformed output. The transformed output is then provided to the internal business application. When the standard format is the XML format, then the transforms may be defined using the Extensible Stylesheet Language ("XSL").

In another embodiment, the integration system allows an internal business application to override the final format of the output of the external business application. The integration system may define a default format (e.g., HTML) for the final output of each external business application. A request received from an internal business application may include the identification of the accessing user agent (e.g., browser) that provides the user interface of the internal business application. The internal business application may also embed a client-specified format into the request. The integration system selects the final output format for the business data giving preference to the client-specified format, then the format associated with the accessing user agent, and finally the default format.

Figure 1:
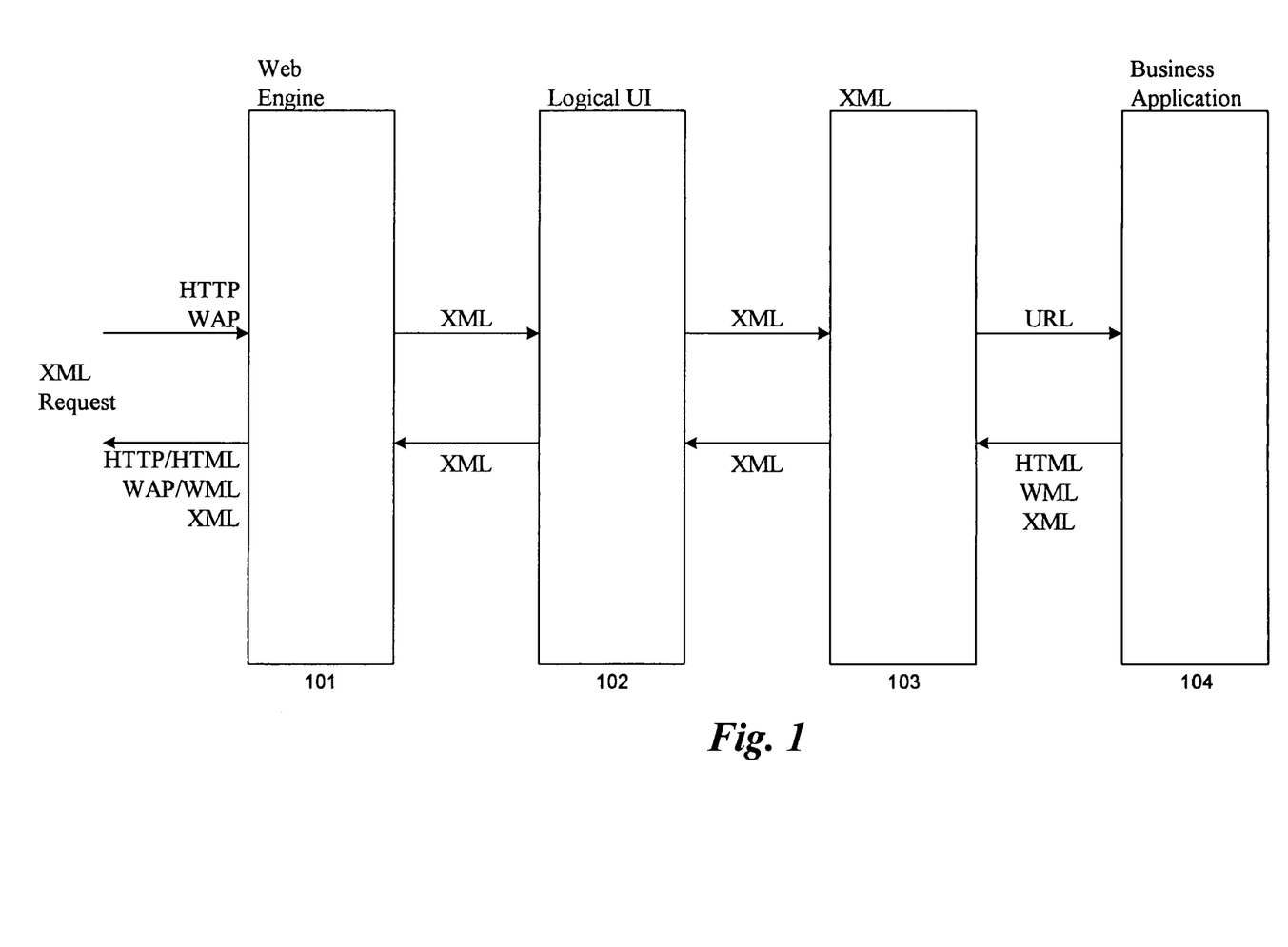
FIG. 1 is a block diagram illustrating components of the integration system in one embodiment.

FIG. 1 is a block diagram illustrating components of the integration system in one embodiment. The system includes a web engine 101, a logical UI layer 102, an XML layer 103, and an external business application layer 104. The web engine layer receives requests in a standard format such as an XML format and forwards the requests for further processing ultimately by the external business application layer. The web engine layer also receives XML data from the logical UI layer and transforms the XML data into a format is appropriate for the requesting internal business application. The web engine layer then transmits the transformed data to the client system for the internal business application. The logical UI layer is responsible for forwarding the request to the XML layer and receiving the response in XML format from the XML layer. The logical UI layer removes UI elements from the XML response as indicated in the request. The logical UI layer then forwards the XML response to the web engine layer. The XML layer receives from the logical UI layer requests in an XML format and converts the requests into invocations of the appropriate business application. The XML layer receives from the external business application the responsive documents and converts them into XML documents, which are forwarded to the logical UI layer. The external business application layer provides the various external business applications and business data. One skilled in the art will appreciate that the terms "internal business application" and "external business application" are used to describe a typical use of the integration system. The integration system can be used to integrate an internal business application with another internal business application, to integrate an external business application with another external business application, or, more generally, to integrate any two applications or computer programs.

The integration system may be implemented on computer systems that include a central processing unit, memory, input devices (e.g., keyboard and pointing devices), output devices (e.g., display devices), and storage devices (e.g., disk drives). The memory and storage devices are computer-readable media that may contain instructions that implement the file sharing system.

Figure 2:
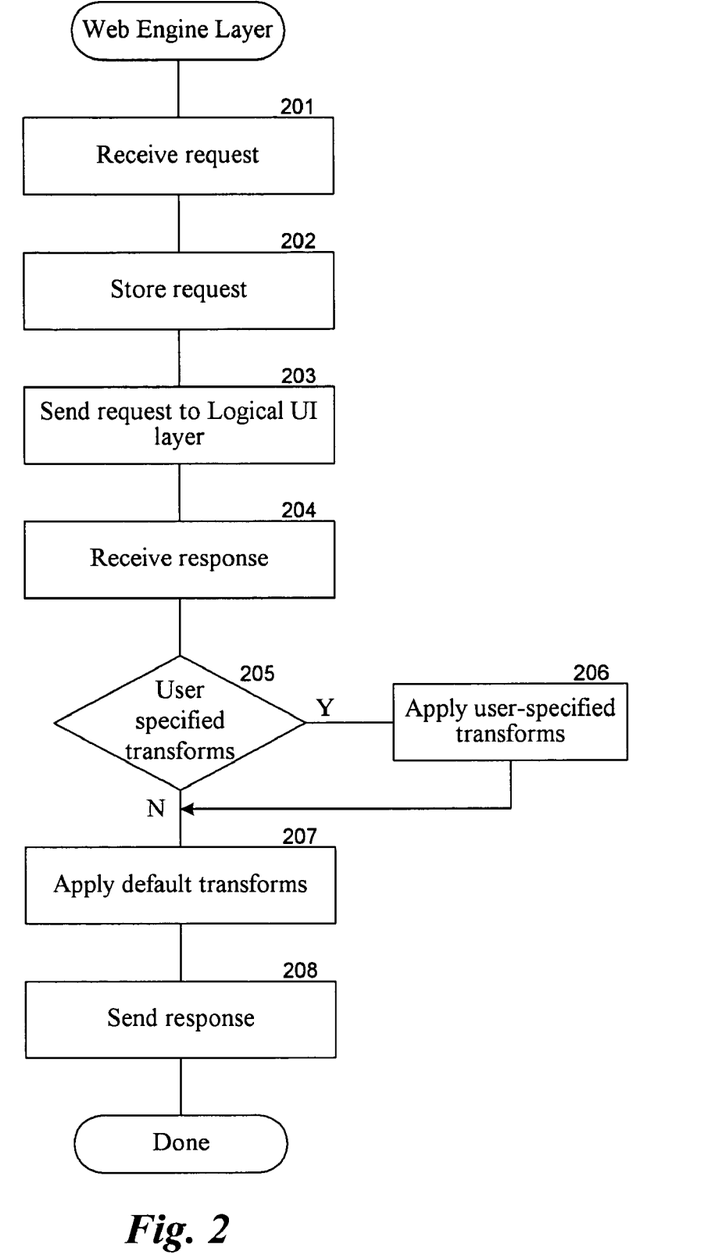
FIG. 2 is a flow diagram illustrating processing of the web engine layer in one embodiment.

FIG. 2 is a flow diagram illustrating processing of the web engine layer in one embodiment. In block 201, the layer receives a request from a requesting internal business application. In block 202, the layer stores the request for future reference. In block 203, the layer sends the request to the logical UI layer. In block 204, the layer receives a response from the logical UI layer. The response is an XML document. In decision block 205, if the internal business application specified a transform in the request, then the layer continues at block 206, else the layer continues at block 207. In block 206, the layer applies the specified transform to the XML document. In block 207, the layer applies a default transform to the XML document. In block 208, the layer sends a responsive message to the client system executing the internal business application and then completes.

Figure 3:
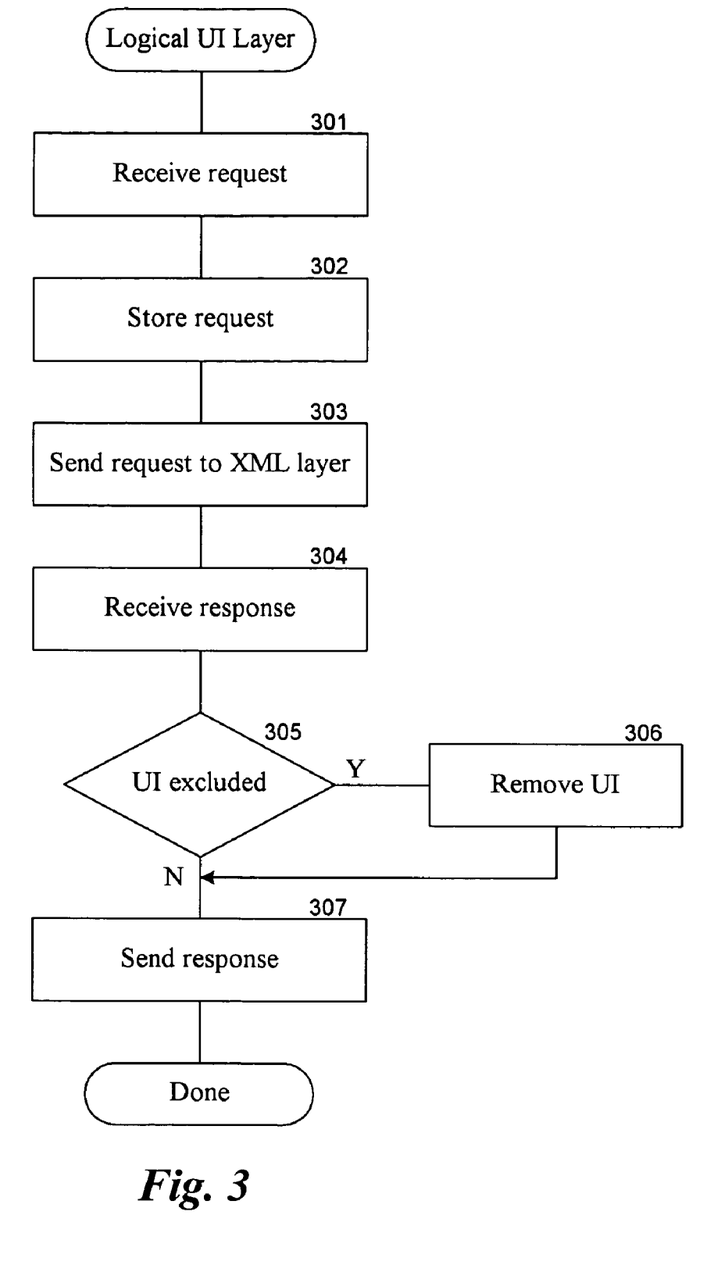
FIG. 3 is a flow diagram illustrating processing of the logical UI layer in one embodiment.

FIG. 3 is a flow diagram illustrating processing of the logical UI layer in one embodiment. In block 301, the layer receives a request from the web engine layer. In block 302, the layer stores the request for future reference. In block 303, the layer sends the request to the XML layer. In block 304, the layer receives the responsive XML document from the XML layer. In decision block 305, if the stored request indicates to exclude any of the UI elements, then the layer continues at block 306, else the layer continues at block 307. In block 306, the layer removes the UI elements as appropriate from the XML document. In block 307, the layer sends the XML document to the web engine layer as a response and then completes.

Figure 4:
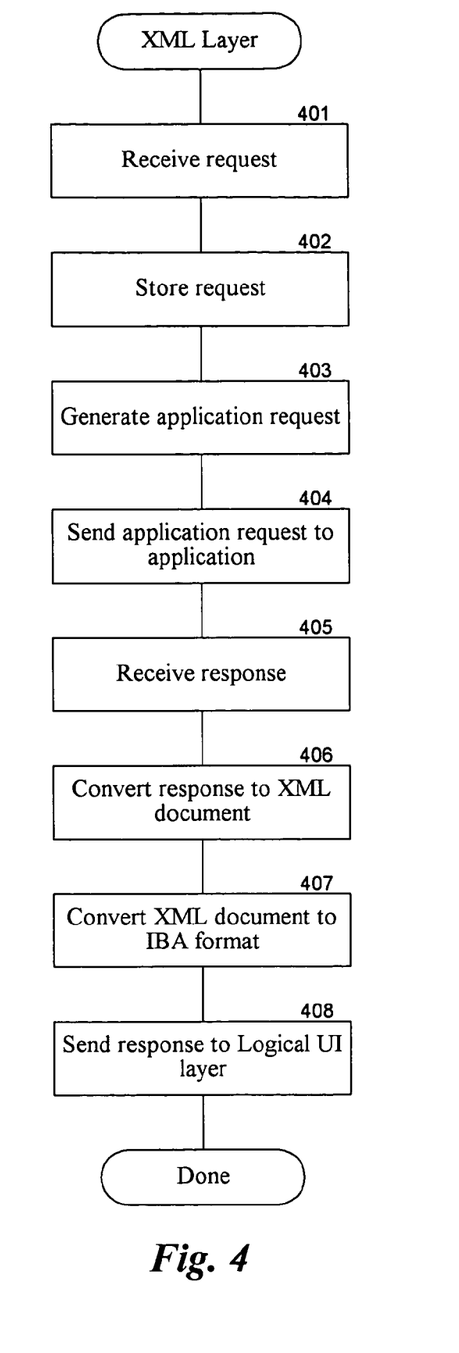
FIG. 4 is a flow diagram illustrating the processing of the XML layer in one embodiment.

FIG. 4 is a flow diagram illustrating the processing of the XML layer in one embodiment. In block 401, the layer receives a request from the logical UI layer. In block 402, the layer stores the request for future reference. In block 403, the layer generates an external business application request from the received request. The external business application request may identify the external method of a business application to invoke. In block 404, the layer sends the request to the external business application or actually invokes the method based on the interface provided by the external business application. In block 405, the layer receives the response from the business application. In block 406, the layer converts the response to an XML document. In block 407, the layer converts the XML document into the appropriate format for the internal business application. If the request specified a format (e.g., HTML, WML, or XML), then the layer converts the XML document to that format. If the request did not specify a format, then the layer selects a format based on a format associated with the user agent specified in the request and the default format (as specified in a configuration file) of the integration system. Table 1 summarizes the format in one embodiment that is selected:

TABLE 1

INTEGRATION SYSTEM DEFAULT

| | USER AGENT | | |
|---|---|---|---|
| | HTML | WML | XML |
| HTML | HTML | HTML | XML |
| WML | XML | WML | XML |
| XML | XML | XML | XML |

In block 408, the layer sends the converted XML document to the logical UI layer as a response to the request and then completes.

Figure 5:
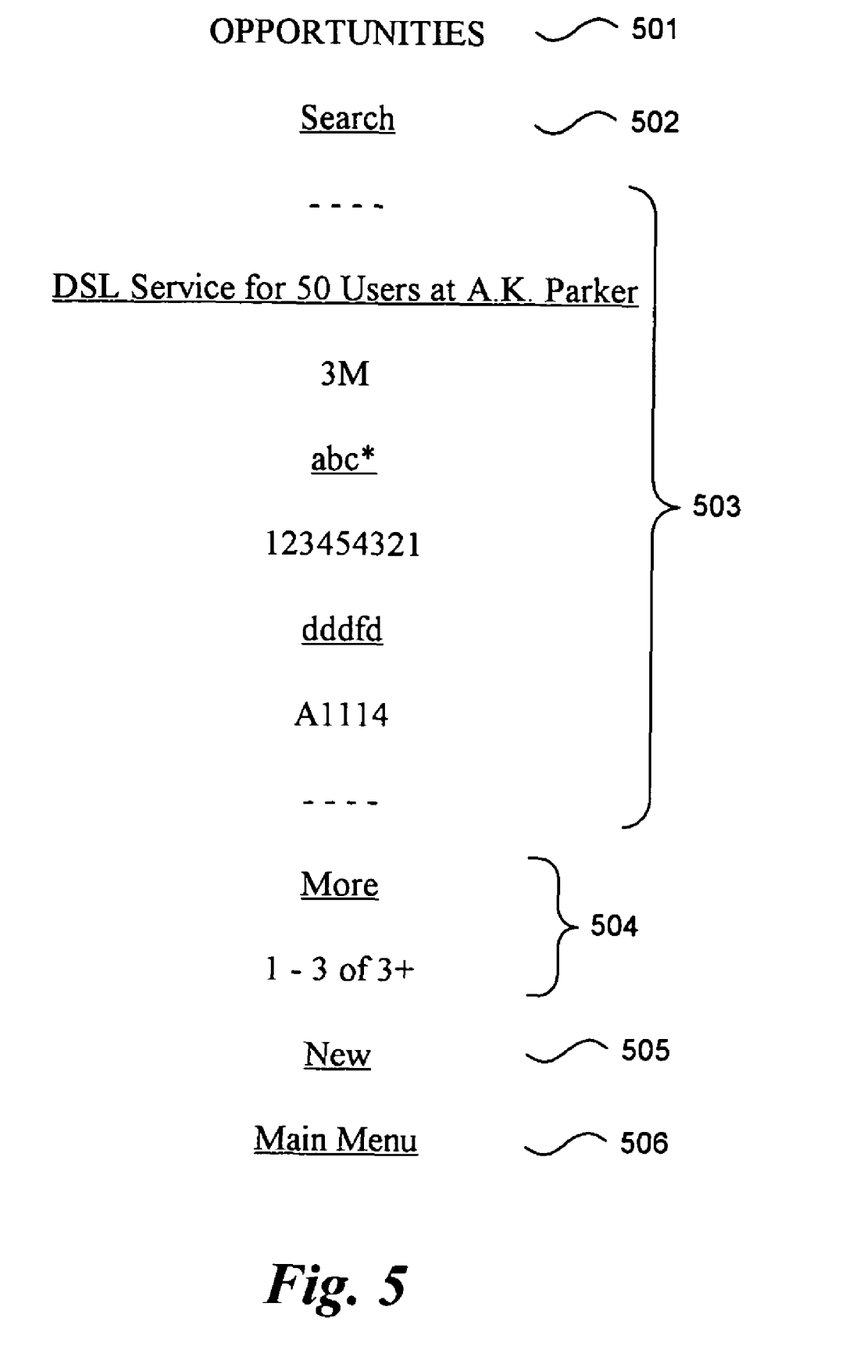
FIG. 5 is a display page corresponding to the resulting HTML document.

Tables 2-4 illustrate the transforming of an XML document into an HTML document by the integration system. FIG. 5 is a display page corresponding to the resulting HTML document. Display page 500 includes title 501, each link 502, list of links 503, more link 504, new link 505, and main menu link 506. Table 2 contains the XML document that represents data generated by a business application. The XML document can be generated directly by the business application or generated by the integration system based on the data generated by the business application. The XML document defines the content of display page 500 using the screen tags lines 5-100. The applet tags at lines 7-98 define various controls for the display page. For example, the control tags at lines 9-22 define the search link 502. When the search link is selected, the command "INV" of the business application is invoked passing the arguments specified at lines 13-18. The list tags at lines 24-68 define the list of links 503. The separator line for the list is defined at line 23 and the more link 504 is defined by the method tags at lines 26-38. The links of the list 503 cause the command defined by the method tags at lines 39-52, to be invoked. The row counter is specified in the applet tag at line 7. The new link and main menu link are defined by the control tags at lines 69-97.

TABLE 2

```
 1.  <?xml version="1.0" encoding="windows-1252" ?>
 2.  <APPLICATION NAME="Siebel Sales webphone">
 3.  <USER_AGENT MARKUP="HTML" />
 4.  <NAVIGATION_ELEMENTS />
 5.  <SCREEN CAPTION="Opportunities" ACTIVE="TRUE" NAME="SWLS Sales
     Opportunity Screen">
 6.  <VIEW ACTIVE="TRUE" TITLE="Opportunities Display" NAME="SWLS Sales
     Opportunity Opportunity Display View">
 7.  <APPLET MODE="Base" ROW_COUNTER="1 - 3 of 3+" NO_INSERT="FALSE"
     ACTIVE="FALSE" CLASS="CSSFrameRerouteListBase" TITLE="Opportunities"
     ID="1" NO_MERGE="FALSE" NO_DELETE="FALSE" NO_UPDATE="FALSE"
     NO_EXEC_QUERY="FALSE" NAME="SWLS Sales Opportunity Opportunity Display
     Applet">
 8.  <CONTROL HTML_TYPE="Text" CAPTION="OPPORTUNITIES" ID="1"
     TYPE="Label" ENABLED="TRUE"
     NAME="AppletTitle">OPPORTUNITIES</CONTROL>
 9.  <CONTROL HTML_TYPE="Link" CAPTION="Search" ID="2" TYPE="Label"
     ENABLED="TRUE" NAME="Search">
10.  Search
11.  <ANCHOR ATTR="#SWEApplet1" PATH="/wpsales/start.swe">
12.  <CMD VALUE="Inv" NAME="C">
13.  <ARG NAME="A">SSOODA</ARG>
14.  <ARG NAME="V">SSOODV</ARG>
15.  <ARG NAME="M">NewQuery</ARG>
16.  <ARG NAME="Nct">true</ARG>
17.  <ARG NAME="R">1-1P6T</ARG>
18.  <ARG NAME="Rqr">0</ARG>
19.  </CMD>
20.  <INFO NAME="Cnt">3</INFO>
21.  </ANCHOR>
22.  </CONTROL>
23.  <CONTROL HTML_TYPE="Text" CAPTION="- - - -" ID="1000" TYPE="Label"
     ENABLED="TRUE" NAME="Separator Line">- - - -</CONTROL>
24.  <LIST>
25.  <RS_HEADER>
26.  <METHOD CAPTION="M    re" NAME="GotoNextSet">
27.  <ANCHOR PATH="/wpsales/start.swe">
28.  <CMD VALUE="Inv" NAME="C">
29.  <ARG NAME="A">SSOODA</ARG>
30.  <ARG NAME="V">SSOODV</ARG>
31.  <ARG NAME="M">GotoNextSet</ARG>
32.  <ARG NAME="Nct">true</ARG>
33.  <ARG NAME="R">1-1P6T</ARG>
34.  <ARG NAME="Rqr">0</ARG>
35.  </CMD>
36.  <INFO NAME="Cnt">3</INFO>
37.  </ANCHOR>
38.  </METHOD>
39.  <METHOD CAPTION="Name" FIELD="Name" NAME="Drilldown">
40.  <ANCHOR PATH="/wpsales/start.swe">
```

TABLE 2-continued

```
41. <CMD VALUE="Inv" NAME="C">
42. <ARG NAME="A">SSOODA</ARG>
43. <ARG NAME="V">SSOODV</ARG>
44. <ARG NAME="M">Drilldown</ARG>
45. <ARG NAME="Nct">true</ARG>
46. <ARG NAME="R" />
47. <ARG NAME="Rqr">1</ARG>
48. <ARG NAME="Rs">SWERowId0=</ARG>
49. </CMD>
50. <INFO NAME="Cnt">3</INFO>
51. </ANCHOR>
52. </METHOD>
53. </RS_HEADER>
54. <RS_DATA>
55. <ROW ROWID="1-1P6T" SELECTED="TRUE">
56. <FIELD VARIABLE="s_1_2_15_0" NAME="Name">DSL Service for 50 Users at
    A.K. Parker</FIELD>
57. <FIELD VARIABLE="s_1_2_14_0" NAME="Account">3M</FIELD>
58. </ROW>
59. <ROW ROWID="10-2PG2H3">
60. <FIELD VARIABLE="s_1_2_15_1" NAME="Name">abc*</FIELD>
61. <FIELD VARIABLE="s_1_2_14_1" NAME="Account">123454321</FIELD>
62. </ROW>
63. <ROW ROWID="10-5FRPU2">
64. <FIELD VARIABLE="s_1_2_15_2" NAME="Name">dddfd</FIELD>
65. <FIELD VARIABLE="s_1_2_14_2" NAME="Account">A1114</FIELD>
66. </ROW>
67. </RS_DATA>
68. </LIST>
69. <CONTROL HTML_TYPE="Link" CAPTION="New" SCALE="0" DATATYPE="text"
    HIDDEN="FALSE" NUMBER_BASED="FALSE" ID="41" TYPE="Label"
    REQUIRED="FALSE" TEXT_BASED="TRUE" CALCULATED="TRUE"
    ENABLED="TRUE" MAX_LENGTH="255" NAME="New Opportunity">
70. New
71. <ANCHOR ATTR="#SWEApplet1" PATH="/wpsales/start.swe">
72. <CMD VALUE="Inv" NAME="C">
73. <ARG NAME="A">SSOODA</ARG>
74. <ARG NAME="V">SSOODV</ARG>
75. <ARG NAME="M">NewRec  rd</ARG>
76. <ARG NAME="F">s_1_1_5_2</ARG>
77. <ARG NAME="Nct">true</ARG>
78. <ARG NAME="R">10-5FRPU2</ARG>
79. <ARG NAME="Rqr">0</ARG>
80. </CMD>
81. <INFO NAME="Cnt">3</INFO>
82. </ANCHOR>
83. </CONTROL>
84. <CONTROL HTML_TYPE="Link" CAPTION="Main Menu" ID="42" TYPE="Label"
    ENABLED="TRUE" NAME="Main Menu">
85. Main Menu
86. <ANCHOR PATH="/wpsales/start.swe">
87. <CMD VALUE="Gp" NAME="C">
88. <ARG NAME="A">SSOODA</ARG>
89. <ARG NAME="V">SSOODV</ARG>
90. <ARG NAME="Nct">true</ARG>
91. <ARG NAME="R">10-5FRPU2</ARG>
92. <ARG NAME="Rqr">0</ARG>
93. <ARG NAME="Pg">SSP</ARG>
94. </CMD>
95. <INFO NAME="Cnt">3</INFO>
96. </ANCHOR>
97. </CONTROL>
98. </APPLET>
99. </VIEW>
100. </SCREEN>
101. </APPLICATION>
```

Table 3 is an XLST transform for transforming the XML document of Table 2 to the HTML document of Table 4. As an example, the "ANCHOR" template tags at lines 150-153 specify how to transform an anchor tag of an XML document into an "A" tag of HTML. One "ANCHOR" template tags use the "CMD" template tags at lines 154-159 to specify how to transform the command and arguments defined in an XML document into HTML.

TABLE 3

```
1. <?xml version="1.0" encoding="UTF-8" ?>
2. <xsl:stylesheet xmlns:xsl="http://www.w3.rg/1999/XSL/Transf rm" version="1.0">
3. <xsl:output method="html" media-type="text/html"/>
```

TABLE 3-continued

```
4.  <!-- This style sheet processes the XML output for both the Splash screens and standard
    views   -->
5.  <!-- ============ Root Document Processing ============   -->
6.  <!-- Document Root   -->
7.  <xsl:template match="/">
8.  <xsl:apply-templates select="//APPLICATION/SCREEN/VIEW/APPLET" />
9.  </xsl:template>
10. <!-- ================ View Processing ============   -->
11. <!-- List Base mode Template   -->
12. <xsl:template match="APPLET">
13. <HTML>
14. <HEADER>
15. <META http-equiv="cache-control" content="no-cache" />
16. </HEADER>
17. <BODY>
18. <b>
19. <!-- Applet Title Label   -->
20. <xsl:value-of select="CONTROL[@ID='1']" />
21. <!-- for calendar title   -->
22. <xsl:value-of select="CALENDAR/@TITLE" />
23. </b>
24. <br />
25. <!-- XML No Record found and other alerts   -->
26. <xsl:if test="string-length(ALERT)>0 and @CLASS='CSSFrameCalRerouteBase'">
27. <xsl:value-of select="ALERT" />
28. <br />
29. </xsl:if>
30. <!-- Search and Title with data or other links   -->
31. <xsl:apply-templates select="CONTROL[@ID=2 or @ID=3 or @ID=4 or @ID=5 or
    @ID=6 or @ID=7 or @ID=8 or @ID=9]" />
32. <!-- Separator line   -->
33. <xsl:apply-templates select="CONTROL[@ID=1000]" />
34. <!-- Display fields for list of records here   -->
35. <xsl:apply-templates select="LIST" />
36. <xsl:if test="string-length(@ROW_COUNTER)>0">
37. <xsl:value-of select="@ROW_COUNTER" />
38. <br />
39. </xsl:if>
40. <!-- control link for New, Main Menu, etc..   -->
41. <xsl:apply-templates select="CONTROL[@ID>=40 and @HTML_TYPE='Link']" />
42. </BODY>
43. </HTML>
44. </xsl:template>
45. <!-- ================ Control and Link Processing ==============   -->
46. <xsl:template match="CONTROL">
47. <xsl:choose>
48. <xsl:when test="@HTML_TYPE='Link'">
49. <xsl:call-template name="build_simple_link" />
50. </xsl:when>
51. <xsl:otherwise>
52. <xsl:value-of select="." />
53. <br />
54. </xsl:otherwise>
55. </xsl:choose>
56. </xsl:template>
57. <xsl:template name="build_simple_link">
58. <xsl:variable name="link">
59. <xsl:apply-templates select="ANCHOR" />
60. </xsl:variable>
61. <xsl:element name="A">
62. <xsl:attribute name="HREF">
63. <xsl:value-of select="$link" />
64. </xsl:attribute>
65. <xsl:value-of select="@CAPTION" />
66. </xsl:element>
67. <br />
68. </xsl:template>
69. <!-- ==================== List processing ==================   -->
70. <!-- LIST Template builds a list of records   -->
71. <xsl:template match="LIST">
72. <!-- first get the URL from the RS_HEADER element   -->
73. <xsl:variable name="link">
74. <xsl:apply-templates select="RS_HEADER/METHOD[@NAME='Drilldown']" />
75. </xsl:variable>
76. <!-- capture the URL before the SWERowId parameter   -->
77. <xsl:variable name="link-prefix">
78. <xsl:value-of select="substring-before($link,'R=')" />
79. </xsl:variable>
80. <!-- capture the URL after the SWERowId parameter   -->
81. <xsl:variable name="link-suffix">
```

TABLE 3-continued

```
82.  <xsl:value-of select="substring-after($link,'R=')" />
83.  </xsl:variable>
84.  <!-- capture the field with the drilldown enabled - use later to build drilldown -->
85.  <xsl:variable name="drilldowncontrol">
86.  <xsl:value-of select="RS_HEADER/METHOD[@NAME='Drilldown']/ @FIELD" />
87.  </xsl:variable>
88.  <!-- loop through the rows in the RS_DATA element -->
89.  <xsl:for-each select="RS_DATA/ROW">
90.  <!-- pickup the Row Id for the Row so we can rebuild the SWERowId URL parameter-->
91.  <xsl:variable name="rowid">
92.  <!-- <xsl:value-of select="@ROWID"/> -->
93.  <xsl:call-template name="ENCODE_ARG">
94.  <xsl:with-param name="encode_string" select="@ROWID" />
95.  </xsl:call-template>
96.  </xsl:variable>
97.  <!-- loop through each field and control in the Row -->
98.  <xsl:for-each select="FIELD|CONTROL">
99.  <xsl:choose>
100. <!-- if the field is the drilldown field then create a link on the display data -->
101. <xsl:when test="@NAME = $drilldowncontrol">
102. <xsl:element name="A">
103. <xsl:attribute name="HREF">
104. <xsl:value-of select="concat(normalize-space($link-prefix),'R=',$rowid,$link-suffix)" />
105. &F=
106. <xsl:value-of select="@VARIABLE" />
107. </xsl:attribute>
108. <xsl:value-of select="." />
109. </xsl:element>
110. </xsl:when>
111. <!-- otherwise just display the data as is -->
112. <xsl:otherwise>
113. <xsl:value-of select="." />
114. </xsl:otherwise>
115. </xsl:choose>
116. <!-- need a break if field is not empty -->
117. <xsl:variable name="empty_field">
118. <xsl:value-of select="." />
119. </xsl:variable>
120. <xsl:if test="string-length($empty_field)!=0">
121. <br />
122. </xsl:if>
123. </xsl:for-each>
124. </xsl:for-each>
125. <!-- Show separator line only if has one or more record -->
126. <xsl:variable name="row_data">
127. <xsl:value-of select="normalize-space(RS_DATA/ROW)"/>
128. </xsl:variable>
129. <xsl:if test="string-length($row_data)>0">
130. <xsl:text>- - - -</xsl:text>
131. <br />
132. </xsl:if>
133. <!-- show More link only if there is next record set -->
134. <xsl:variable name="more_link">
135. <xsl:value-of select="normalize-space(RS_HEADER/METHOD[@NAME='GotoNextSet']/@CAPTION)" />
136. </xsl:variable>
137. <xsl:if test="string-length($more_link)>0">
138. <xsl:element name="A">
139. <xsl:attribute name="HREF">
140. <xsl:apply-templates select="RS_HEADER/METHOD [@NAME='GotoNextSet']" />
141. </xsl:attribute>
142. <xsl:value-of select="$more_link" />
143. </xsl:element>
144. <br />
145. </xsl:if>
146. </xsl:template>
147. <!-- =============== Anchor URL Processing ================ -->
148. <!-- THIS PART IS USED EVERYWHERE, WILL BE IN A SEPARATE FILE AND IMPORTED IN LATER === -->
149. <!-- ANCHOR Template builds the URL for drilldowns and links -->
150. <xsl:template match="ANCHOR">
151. <xsl:text>start.swe?</xsl:text>
152. <xsl:apply-templates select="CMD|INFO" />
153. </xsl:template>
154. <xsl:template match="CMD">
155. <xsl:value-of select="@NAME"/>
156. =
157. <xsl:value-of select="@VALUE" />
158. <xsl:apply-templates select="ARG" />
```

TABLE 3-continued

```
159. </xsl:template>
160. <xsl:template match="ARG">
161. <xsl:variable name="arg">
162. <xsl:if test="string-length(normalize-space(.)) >0">
163. <xsl:variable name="argstring">
164. <xsl:if test="@NAME='Pu' or @NAME='R' or @NAME='Rs')">
165. <!--   replace + with %2B   -->
166. <xsl:call-template name="ENCODE_ARG">
167. <xsl:with-param name="encode_string" select="normalize-space(.)"/>
168. </xsl:call-template>
169. </xsl:if>
170. <xsl:if test="not (@NAME='Pu' or @NAME='R' or @NAME='Rs')">
171. <xsl:value-of select="normalize-space(.)" />
172. </xsl:if>
173. </xsl:variable>
174. <xsl:value-of select="$argstring" />
175. </xsl:if>
176. </xsl:variable>
177. <xsl:text>&</xsl:text>
178. <xsl:value-of select="@NAME" />
179. =
180. <xsl:value-of select="$arg" />
181. <!--  <xsl:text>&</xsl:text>  -->
182. <!--  <xsl:value-of select="@NAME"/>=<xsl:value-of select="translate
      ($arg,' ','+')'"/>   -->
183. </xsl:template>
184. <xsl:template name="ENCODE_ARG">
185. <xsl:param name="encode_string" />
186. <!--  just return the value and stop   -->
187. <xsl:if test="not (contains($encode_string, '+'))">
188. <xsl:value-of select="$encode_string" />
189. </xsl:if>
190. <!--  recursive processing    -->
191. <xsl:if test="contains($encode_string, '+')">
192. <xsl:value-of select="substring-before($encode_string, '+')" />
193. <xsl:text>%2B</xsl:text>
194. <!--   replace + with %2B    -->
195. <xsl:call-template name="ENCODE_ARG">
196. <xsl:with-param name="encode_string" select="substring-after($encode_string,
     '+')" />
197. </xsl:call-template>
198. </xsl:if>
199. </xsl:template>
200. <xsl:template match="INFO">
201. <xsl:variable name="info">
202. <xsl:if test="string-length(normalize-space(.)) >0">
203. <!--  <xsl:value-of select="."/>   -->
204. <xsl:value-of select="normalize-space(.)" />
205. </xsl:if>
206. </xsl:variable>
207. <xsl:text>&</xsl:text>
208. <xsl:value-of select="@NAME" />
209. =
210. <xsl:value-of select="$inf    " />
211. </xsl:template>
212. </xsl:stylesheet>
```

Table 4 contains the HTML document resulting from the transformation of Table 2 using the transform of Table 3. The HMTL document of Table 4 defines display page 500. The "A" tags of lines 8-10 define the search link 502 of the display page. That tag identifies the business application, "start.swe," the command, "INV," and the arguments, A, V, M, Nct, R, Rqr, and Cnt, to be passed to the business application when the command is invoked.

TABLE 4

```
1. <HTML>
2. <HEADER>
3. <META http-equiv="cache-control" content="no-cache">
4. </HEADER>
5. <BODY>
6. <b> OPPORTUNITIES</b>
7. <br>
8. <A HREF="start.swe?C=Inv&A=SSOODA&V=SSOODV&M=NewQuery&Nct=true&R=1-
   1P6T&Rqr=0&Cnt=2">
9. Search
10. </A>
11. <br>
12. - - - -
```

TABLE 4-continued

```
13. <br>
14. <A HREF="start.swe?C=Inv&A=SSOODA&V=SSOODV&M=Drilldown&Nct=true &R=1-
    1P6T&Rqr=1&Rs=SWERowId0=&Cnt=2%0A&F=s_1_2_15_0">
15. DSL Service for 50 Users at A.K. Parker </A>
16. <br>
17. 3M
18. <br>
19. <A
    HREF="start.swe?C=Inv&A=SSOODA&V=SSOODV&M=Drilldown&Nct=true&R=10-2
    PG2H3&Rqr=1&Rs=SWERowId0=&Cnt=2%0A&F=s_1_2_15_1">   abc*   </A>
20. <br>
21. 123454321
22. <br>
23. <A
    HREF="start.swe?C=Inv&A=SSOODA&V=SSOODV&M=Drilldown&Nct=true&R=10-5
    FRPU2&Rqr=1&Rs=SWERowId0=&Cnt=2%0A&F=s_1_2_15_2">
24. ddddfd
25. </A>
26. <br>
27. A1114
28. <br>
29. - - - -
30. <br>
31. <A HREF="%0Astart.swe?C=Inv&A=SSOODA&V=SSOODV&M=GotoNextSet&Nct=true
    &R=1-1P6T&Rqr=0&Cnt=2%0A">
32. More
33. </A>
34. <br>
35. 1 - 3 of 3+
36. <br>
37. <A HREF="start.swe?C=Inv&A=SSOODA&V=SSOODV&M=NewRecord&F=s_1_1_5_2&
    Nct=true&R=10-5FRPU2&Rqr=0&Cnt=2">
38. New
39. </A>
40. <br>
41. <A HREF="start.swe?C=Gp&A=SSOODA&V=SSOODV&Nct=true&R=10-5FRPU2&Rqr=
    0&Pg=SSP&Cnt=2">
42. Main Menu
43. </A>
44. <br>
45. </BODY>
46. </HTML>
```

The table below lists the XML tags that are used to specify a command block in a request sent by an internal business application.

| Tag | Description |
| --- | --- |
| <EXEC> | This tag is the root tag for each command sent to the integration system, the <EXEC> tag encloses the <CMD> and <ARG> tags. |
| <CMD> | This tag indicates the external business application command to be invoked and encloses all arguments for the command. |
| <ARG> | This tag indicates the object on which the command is to be executed and any additional parameters that are required. Unlike the <EXEC> and <CMD> tags, which are used only once in a command block, there can be multiple <ARG> tags within a command block. |

Each <EXEC> tag encloses a complete command block. The <CMD> and <ARG> tags are enclosed within the <EXEC> tag, and their attributes and values specify which business application and commands are to be executed. A valid syntax format for a command block is as follows:

```
<EXEC>
    <CMD NAME="SWEcmd" VALUE="command name">
        <ARG NAME="argumentName">argument1Value</ARG>
        <ARG NAME="argumentName">argument2Value</ARG>
        ...
        <ARG NAME="argumentName">argumentNValue</ARG>
        <ARG NAME="SWESetMarkup"> XML | HTML </ARG>
        <ARG NAME="SWEDataOnly"> TRUE | FALSE </ARG>
        <ARG NAME="SWESetNoTempl"> TRUE </ARG>
    </CMD>
</EXEC>
```

The PATH attribute of the <EXEC> tag specifies an object manager to be associated with executing of the command. If the PATH attribute is not specified, the object manager at a default location is used. The external business application uses the object manager to access the business data. The table below lists the attributes of the <EXEC> tag:

| Attribute | Description |
| --- | --- |
| PATH | This attribute indicates the location of the object manager that provides the interface between the external business application and the business data. |

The following example uses the PATH attribute to specify an object manager.

```
<EXEC PATH="/eAuctionSWEXML/start.swe">
    <CMD NAME="SWECmd" VALUE="ExecuteLogin">
        <ARG NAME="SWEUserName">jdoe</ARG>
        <ARG NAME="SWEPassword">jdoepassword</ARG>
        <ARG NAME="SWESetMarkup">XML</ARG>
        <ARG NAME="SWEDataOnly">TRUE</ARG>
        <ARG NAME="SWESetNoTempl">TRUE</ARG>
    </CMD>
</EXEC>
```

The table below lists the attributes of the <CMD> tag:

| Attribute | Description |
| --- | --- |
| NAME | This attribute identifies the business application. |
| VALUE | This attribute specifies which to execute. Common commands may be:<br>- ExecuteLogin<br>- GotoPageTab<br>- InvokeMethod<br>- LogOff |

The following example illustrates the use of the <CMD> tag to execute a login command:

```
<EXEC PATH="/eAuctionSWEXML/start.swe">
    <CMD NAME="SWECmd" VALUE="ExecuteLogin">
        <ARG NAME="SWEUserName">jdoe</ARG>
        <ARG NAME="SWEPassword">jdoepassword</ARG>
        <ARG NAME="SWESetMarkup">XML</ARG>
        <ARG NAME="SWEDataOnly">TRUE</ARG>
        <ARG NAME="SWESetNoTempl">TRUE</ARG>
    </CMD>
</EXEC>
```

A command block can contain multiple <ARG> tags. Each <ARG> tag indicates an additional command parameter to complete the action specified in the command block. The <ARG> tag uses name/value pairs to specify command parameters for the external business application. The table below describes the attributes of the <ARG> tag:

| Attribute | Description |
| --- | --- |
| NAME | This attribute is used to indicate an argument, or the name of a parameter. The parameter's value is entered between the open and close Argument tags. Listed below are common parameter names:<br>- SWEApplet<br>- SWEDataOnly<br>- SWEMethod<br>- SWEPassword<br>- SWEScreen<br>- SWESetNoTempl<br>- SWESetMarkup<br>- SWESetRowCount<br>- SWEStyleSheet<br>- SWEUserName<br>- SWEView |

The following two arguments may be required for each command block sent to the interface system:
<ARG NAME="SWESetMarkup">XML|HTML|WML</ARG>
<ARG NAME="SWEDataOnly">TRUE|FALSE</ARG>

The integration system returns a response for each command block it receives. The SWESetMarkup attribute indicates whether a response is returned as XML, HTML, or WML. The response markup format can also be selected based on the user agent specified in the request and the default for the integration system. In addition to specifying the type of markup language for a response, the request may indicate whether the response should include data elements only or data elements and user interface elements, such as non-data controls (anchors and navigation controls). When the SWEDataOnly attribute is set to TRUE when only data elements are to be returned. When it is set to FALSE, both data elements and user interface elements are to be returned.

Table 5 contains description of some of the tags of the XML document in one embodiment.

TABLE 5

| | |
| --- | --- |
| <APPLICATION> | The root tag for each response that is returned from the integration system, the <APPLICATION> tag encloses all the response data.<br>Attribute:<br>NAME<br>This attribute indicates the name of the application from which the response is generated. |
| <SCREEN> | This tag identifies the screen that is the result of, or is accessed by the command in the request. The <SCREEN> tag also encloses all of the XML tags that identify the data within the screen.<br>Attributes:<br>CAPTION<br>This attribute indicates the caption of the screen.<br>ACTIVE<br>A value of TRUE indicates that the screen is active. A value of FALSE indicates that the screen is inactive.<br>NAME<br>This attribute indicates the screen name, which is used to identify the screen. |
| <VIEW> | This tag identifies the view that is the result of, or is accessed by the command block in the request. This tag also encloses all of the XML tags that identify the data within the view.<br>Attributes:<br>TITLE<br>This attribute indicates the title of the view.<br>ACTIVE<br>A value of TRUE indicates that the view is active. A value of FALSE indicates that the view is inactive.<br>NAME<br>This attribute indicates the view name, which is used to identify the view. |

TABLE 5-continued

| | |
|---|---|
| <APPLET> | This tag identifies the applet that is the result of, or is accessed by the command block in the request. It also encloses all of the XML tags that identify the data within the applet.<br>Attributes:<br>ROW_COUNTER<br>This attribute indicates how many records out of the entire set of records are currently displayed. The ROW_COUNTER attribute is a string of the form, 1 - n of N.<br>NO_DELETE<br>A value of TRUE indicates that the records in the applet cannot be deleted.<br>A value of FALSE indicates that the records in the applet can be deleted.<br>NO_EXEC_QUERY<br>A value of TRUE indicates that a query cannot be executed in the applet.<br>A value of FALSE indicates that a query can be executed in the applet.<br>NO_UPDATE<br>A value of TRUE indicates that the records in the applet cannot be updated. A value of FALSE indicates that the records in the applet can be updated.<br>MODE<br>Indicates the mode of the applet, which can be one of the following: Base, Edit, New, Query, Sort.<br>TITLE<br>This attribute title of the applet.<br>NO_INSERT<br>A value of TRUE indicates that records cannot be inserted into the applet.<br>CLASS<br>Indicates the class being used by the applet.<br>NO_MERGE<br>A value of TRUE indicates that records in the applet have not been merged. A value of FALSE indicates that the records in the applet have been merged.<br>ACTIVE<br>A value of TRUE indicates that the applet is active. A value of FALSE indicates that the applet is inactive.<br>ID<br>This attribute indicates the applet ID, and can be used to identify the applet.<br>NAME<br>This attribute indicates the applet name, which is used to identify the applet. |
| <LIST> | This tag encloses the table of records that are returned from the request. The following two tags and their subordinate tags are enclosed within the <LIST> tag:<br><RS_HEADER><br><RS_DATA><br>There are no attributes associated with the <LIST> tag. |
| <RS_HEADER> | This tag encloses all the header information about the columns in a list that the request returns. The <COLUMN>, <METHOD>, and <ERROR> tags can be enclosed within this tag. |
| <COLUMN> | A response can return multiple <COLUMN> tags. Each <COLUMN> tag within an <RS_HEADER> tag indicates another column within the parent list.<br>Attributes:<br>NUMBER_BASED<br>A value of TRUE indicates that the data in the column are numeric. A value of FALSE indicates that the data are not numeric.<br>CALCULATED<br>A value of TRUE indicates that the data in the column are calculated from other values, as opposed to being input. A value of FALSE indicates that the data are not calculated.<br>LIST_EDITABLE<br>A value of TRUE indicates that the data in the column are editable. A value of FALSE indicates the data are not editable.<br>HTML_TYPE<br>This attribute is used to indicate the type of object that is represented in the column.<br>SCALE<br>A value of TRUE indicates that the data in the column are scaled. A value of FALSE indicates that the data are not scaled.<br>FIELD<br>This attribute indicates the field name associated with the column. The value in the field name is the same as the column name.<br>HIDDEN<br>A value of TRUE indicates that the data in the column are hidden on the screen. A value of FALSE indicates that the data are visible on the screen.<br>DATATYPE<br>This attribute indicates the data-type of the data in the column.<br>DISPLAY_NAME<br>This attribute indicates the text string that would appear on the screen if was displayed.<br>TEXT_LENGTH<br>This attribute indicates the maximum length of field entries in the column.<br>TYPE<br>This attribute is used to indicate the type of object that is represented in the column.<br>ID |

TABLE 5-continued

| | |
|---|---|
| | This attribute indicates the unique ID of the column.<br>TEXT_BASED<br>A value of TRUE indicates that the data in the column are text based. A value of FALSE indicates that the data are not text based.<br>NAME<br>A value of TRUE indicates that the data in the column are hidden on the screen. A value of FALSE indicates that the data are visible on the screen.<br>REQUIRED<br>A value of TRUE indicates that the data in the column are required. A value of FALSE indicates that the data are not required.<br>READ_ONLY<br>A value of TRUE indicates that the data in the column are readonly and cannot be modified. A value of FALSE indicates that the data are editable. |
| <RS_DATA> | This tag encloses table rows that are returned from the request. The <RS_DATA> tag encloses the <ROW> tag and the <ROW> tag's subordinate tags. |
| <ROW> | A response can return multiple <ROW> tags. Each <ROW> tag within an <RS_DATA> tag indicates another record within the table. The <ROW> tag encloses the <FIELD> tag.<br>Attributes:<br>SELECTED<br>This attribute indicates whether the current row is selected. A value of TRUE indicates that the row is selected. A value of FALSE indicates it is not.<br>ROWID<br>This attribute is used to identify the row. |
| <FIELD> | A response can return multiple <FIELD> tags. Each <FIELD> tag within a <ROW> tag indicates another item of data within the record. The field's value is entered between the open and close <FIELD> tags.<br>Attributes:<br>VARIABLE<br>This attribute indicates the column to which the field is associated. The value of the VARIABLE attribute should coincide with the NAME attribute of a column.<br>NAME<br>This attribute is used to identify the field. In most cases, the field name is identical to the column name. |

It will be appreciated that although specific embodiments of the integration system have been described herein for purposes of illustration, various modifications may be made without deviating from the spirit and scope of the invention. Accordingly, the invention is not limited except by the appended claims.

We claim:

1. A method comprising:
   integrating external business application information into an internal business application, wherein
   the integrating is performed by an integration system communicatively coupled to the internal business application and an external business application,
   the integrating comprises
   receiving a request from the internal business application, wherein
   the request comprises
   an execute element, and
   an argument element,
   the execute element is configured to cause the external business application to execute a command of the external business application, and
   the argument element comprises an indication of one or more user interface elements that are to be returned,
   sending the request to the external business application via the integration system,
   in response to the request, receiving a response from the external business application at the integration system, wherein
   the response comprises
   a data element, wherein
   the data element is generated as a first result of the external business application executing the command, and
   the one or more user interface elements, wherein
   the one or more user interface elements are generated as a second result of the external business application executing the command,
   the one or more user interface elements correspond to a subset of user interface elements provided by the external business application, and
   the subset of user interface elements is selected according to the argument element, and
   sending the external business application information to the internal business application via the integration system, wherein
   the external business application information comprises
   the data element, and
   the one or more user interface elements.

2. The method of claim 1 wherein the argument element indicates a type of user interface elements to return.

3. The method of claim 1 wherein the argument element indicates which type of user interface elements to not return.

4. The method of claim 3 wherein the type of user interface elements not to return is navigation data.

5. The method of claim 1 wherein
   the integrating further comprises causing the internal business application to display the external business application information.

6. The method of claim 1 wherein
   the integrating further comprises causing the internal business application to override the final format of the external business application information.

7. The method of claim 1 further comprising:
   receiving a list of predefined queries in response to the request, wherein
   the list of predefined queries comprises a predefined query.

8. A method in a server system comprising:
integrating external business application information into an internal business application, wherein
the integrating is performed by an integration system communicatively coupled to the internal business application and an external business application,
the internal business application provides transforms to the integration system for transforming output of the external business application, each transform of the transforms having a name,
the integrating comprises
receiving a request from the internal business application, wherein
the request comprises
an execute element, and
an argument element,
the execute element is configured to cause the external business application to execute a command of the external business application,
the argument element comprises an indication of one or more user interface elements that are to be returned, and
the argument element optionally indicates the name of a transform to be applied to the output of the external business application;
sending the request to the external business application via the integration system,
in response to the request, receiving a response from the external business application at the integration system, wherein
the response comprises
a data element, wherein
the data element is generated as a first result of the external business application executing the command,
the one or more user interface elements, wherein
the one or more user interface elements are generated as a second result of the external business application executing the command,
the one or more user interface elements correspond to a subset of user interface elements provided by the external business application, and
the subset of user interface elements is selected according to the argument element,
generating a generated output comprising the data element and the one or more user interface elements,
sending the external business application information to the internal business application via the integration system, wherein
when the argument element indicates the name of the transform,
generating a transformed output by applying the transform to the generated output, and
the external business application information comprises the transformed output, and
otherwise,
the external business application information comprises the generated output.

9. The method of claim 8 wherein the request comprises an "SWEStyleSheet" argument.

10. A method comprising:
integrating external business application information into an internal business application, wherein
the integrating is performed by an integration system communicatively coupled to the internal business application and an external business application,
the internal business application provides a default format to the integration system for output of the external business application,
the integrating comprises
receiving a request from the internal business application, wherein
the request comprises
an execute element, and
an argument element,
the execute element is configured to cause the external business application to execute a command of the external business application,
the argument element comprises an indication of one or more user interface elements that are to be returned, and
the argument element optionally indicates a user agent format or a client-specified format for the output of the external business application,
sending the request to the external business application via the integration system,
in response to the request, receiving a response from the external business application at the integration system, wherein
the response comprises
a data element, wherein
the data element is generated as a first result of the external business application executing the command,
the one or more user interface elements, wherein
the one or more user interface elements are generated as a second result of the external business application executing the command,
the one or more user interface elements correspond to a subset of user interface elements provided by the external business application, and
the subset of user interface elements is selected according to the argument element, and
sending the external business application information to the internal business application via the integration system, wherein
the external business application information comprises the response,
the response is formatted according to a format,
the format is selected giving preference to the following order (1) the client-specified format, (2) the user-agent format, and (3) the default format.

11. The method of claim 10 wherein the user-agent format is selected over the default format in accordance with a predefined preference of formats.

12. The method of claim 10 wherein the user-agent format is based on type of user agent specified in the request.

13. The method of claim 12 wherein the type of user agent specifies a type of browser.

14. The method of claim 10 wherein the formats are a markup language.

15. The method of claim 14 wherein one of the formats is HTML.

16. The method of claim 14 wherein one of the formats is XML.

17. The method of claim 14 wherein one of the formats is WML.

18. The method of claim 10 wherein the request comprises an "SWESetMarkup" argument that specifies the client-specified format.

19. A computer-readable storage medium storing computer instructions that when executed cause a computer to perform a method comprising:
    integrating external business application information into an internal business application, wherein
        the integrating is performed by an integration system communicatively coupled to the internal business application and an external business application,
        the internal business application provides transforms to the integration system for transforming output of the external business application, each transform having a name,
        the integrating comprises
            receiving a request from the internal business application, wherein
                the request comprises
                    an execute element, and
                    an argument element,
                the execute element is configured to cause the external business application to execute a command of the external business application,
                the argument element comprises an indication of one or more user interface elements that are to be returned, and
                the argument element optionally indicates the name of a transform to be applied to the output of the external business application;
            sending the request to the external business application via the integration system,
            in response to the request, receiving a response from the external business application at the integration system, wherein
            the response comprises
            a data element, wherein
                the data element is generated as a first result of the external business application executing the command,
                the one or more user interface elements, wherein
                    the one or more user interface elements are generated as a second result of the external business application executing the command,
                    the one or more user interface elements correspond to a subset of user interface elements provided by the external business application, and
                    the subset of user interface elements is selected according to the argument element,
                generating a generated output comprising the data element and the one or more user interface elements,
            sending the external business application information to the internal business application via the integration system, wherein
                when the argument element indicates the name of the transform,
                    generating a transformed output by applying the transform to the generated output, and
                    the external business application information comprises the transformed output, and
                otherwise,
                    the external business application information comprises the generated output.

20. The computer-readable storage medium of claim 19 wherein zero or more occurrences of a command element are nested within the execute element.

21. The computer-readable storage medium of claim 19 wherein only one command element is nested within the execute element.

22. A computer-readable storage medium storing computer instructions that when executed cause a computer to perform a method comprising:
    integrating external business application information into an internal business application, wherein
        the integrating is performed by an integration system communicatively coupled to the internal business application and an external business application,
        the integrating comprises
            receiving a request from the internal business application, wherein
                the request comprises
                    an execute element, and
                    an argument element,
                the execute element is configured to cause the external business application to execute a command of the external business application, and
                the argument element comprises an indication of one or more user interface elements that are to be returned,
            sending the request to the external business application via the integration system,
            in response to the request, receiving a response from the external business application at the integration system, wherein
                the response comprises
                a data element, wherein
                    the data element is generated as a first result of the external business application executing the command, and
                    the one or more user interface elements, wherein
                        the one or more user interface elements are generated as a second result of the external business application executing the command,
                        the one or more user interface elements correspond to a subset of user interface elements provided by the external business application, and
                        the subset of user interface elements is selected according to the argument element, and
            sending the external business application information to the internal business application via the integration system, wherein
                the external business application information comprises some or all of the response to the request.

23. A method comprising:
    integrating external business application information into an internal business application, wherein
        the integrating is performed by an integration system communicatively coupled to the internal business application and an external business application,
        the integrating comprises
            receiving a request from the internal business application, wherein
                the request comprises
                    an execute element, and
                    an argument element,
                the execute element is configured to cause the external business application to execute a command of the external business application,
                the argument element comprises an indication of one or more user interface elements that are to be returned,
            sending the request to the external business application via the integration system,
            in response to the request, receiving a response from the external business application at the integration system, wherein the response comprises
a data element, wherein
the data element is generated as a first result of the external business application executing the command, and
when the argument element indicates to return the one or more user interface elements,
generating the one or more user interface elements, wherein
the one or more user interface elements correspond to a subset of user interface elements provided by the external business application, and
the subset of user interface elements is selected according to the argument element, and
sending the external business application information to the internal business application via the integration system, wherein
the external business application information comprises the data element,
when the argument element indicates to return the one or more user interface elements, the external business application information comprises the one or more user interface elements, and
otherwise, the external business application information does not include the one or more user interface elements.

24. The method of claim 23 wherein the request indicates a type of user interface element to return.

25. The method of claim 23 wherein the request indicates a type of user interface element to not return.

26. The method of claim 25 wherein the type of user interface element not to return is navigation data.

27. The method of claim 23 wherein the request comprises an "SWEDataOnly" argument.

28. The method of claim 23 wherein the request comprises an "SWEApplet" argument.

29. The method of claim 23 further comprising:
receiving a list of predefined queries in response to the request, wherein
the list of predefined queries comprises a predefined query.

* * * * *